Figure 1:
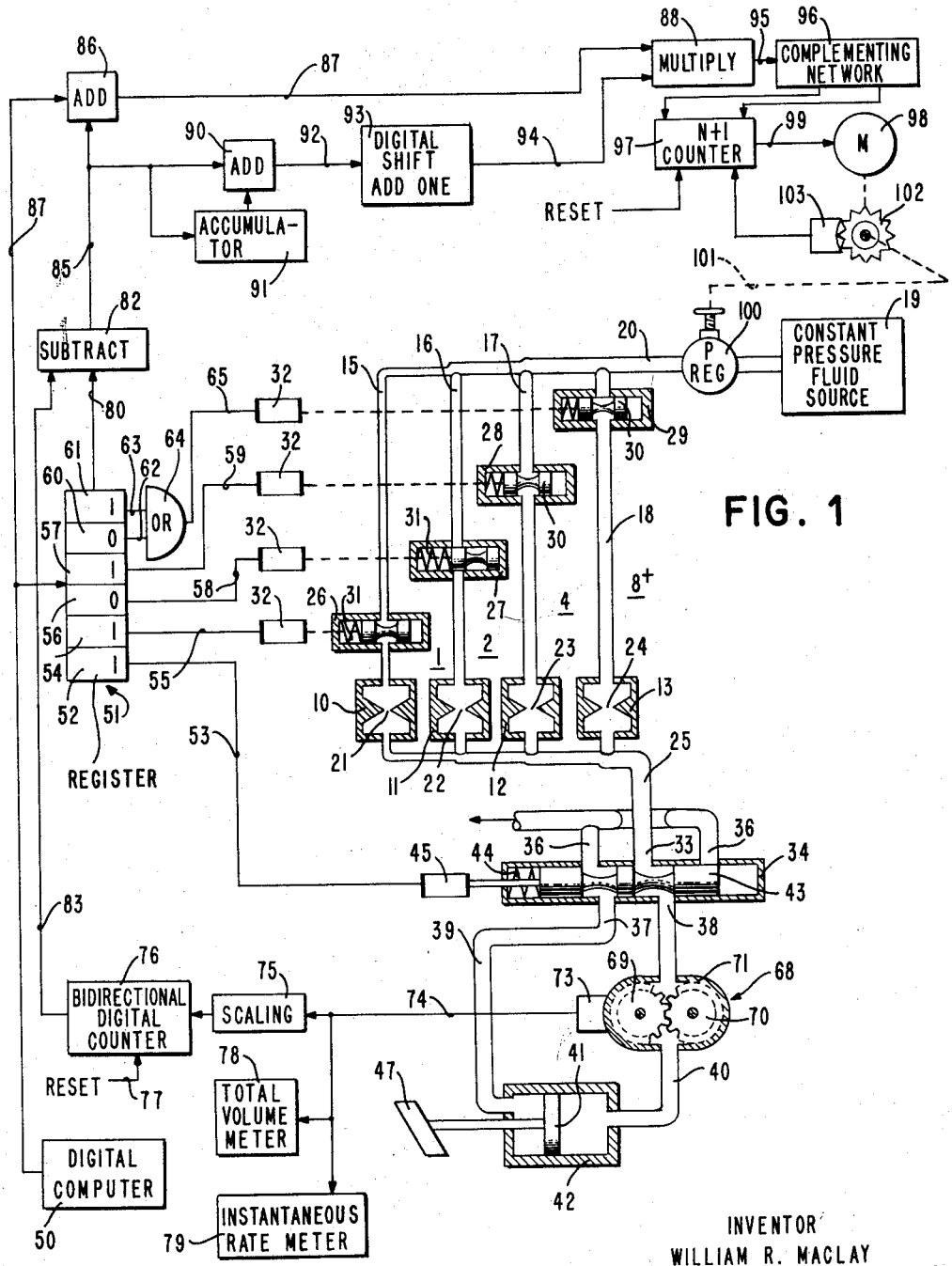

March 19, 1963 W. R. MACLAY 3,081,942
DIGITAL-TO-ANALOG CONTROL SYSTEM
Filed Sept. 18, 1961 2 Sheets-Sheet 1

INVENTOR
WILLIAM R. MACLAY
BY Paul D. Carmichael
ATTORNEY 3,081,942
DIGITAL-TO-ANALOG CONTROL SYSTEM
William R. Maclay, Endicott, N.Y., assignor to International Business Machines Corporation, New York, N.Y., a corporation of New York
Filed Sept. 18, 1961, Ser. No. 138,871
17 Claims. (Cl. 235—151)

The present invention relates generally to the control arts and more particularly to a control system for the conversion of coded electrical signals to an analog output as represented by a rate of movement or rate of application of a force, for example.

In many applications, an important requirement is the fast and accurate computation of information quantities representing functional relationships and employed for control purposes in a real-time environment. Means must be provided for converting the coded electrical signals or information quantities, which may be in binary digital form, to usable mechanical movements or forces. For example, in missile and aircraft control apparatus, a digital computer computes course information and deviations therefrom to provide coded electrical signals representing the required rate of change of a movable control member for reorienting or repositioning the missile or aircraft.

It is necessary to convert the coded electrical signals supplied by the computer to analog movements of the control member. The actual rate of movement of the control member is monitored to insure that the desired corrections have been made to properly reorientate or reposition the missile or aircraft. Means must be provided for changing the rate of movement of the control member whenever the same does not accurately follow the coded electrical signals within allowable tolerances. Further, the control member should move in a smooth manner which faithfully corresponds to the coded electrical signals provided by the computer.

Many types of digital-to-analog conversion devices have been proposed in the art and recent advancements in this area have been toward the direct utilization of digital electrical signals by fluid operational translating equipment. This approach to the conversion problem is sometimes referred to by the term "digital hydraulics." A plurality of glob cylinders whose volumes are directly related to the binary system employed in the computer are provided. The pistons of the glob cylinders are actuated through suitable control circuits by the digital electrical signals from the computer. The arrangement is such that a volume of fluid which is the analog equivalent for each digital electrical signal is dispensed. Such an arrangement is disclosed in U.S. Patent No. 2,923,131 to Furman et al., which is assigned to the assignee of the present invention.

Briefly, the present invention comprises a plurality of precalibrated dispensing means actuatable in parallel to feed metered amounts of fluid to a supply line. The supply line is in communication with an actuating device controlling the movement of a control member. A sign determination means is incorporated for controlling the direction of movement of the control member. Pulse generating and scaling means provide feedback signals representing the actual rate of fluid flow and rate of movement of the control member. These feedback signals are compared with the coded electrical signals from the computer and a control signal is obtained for changing the rate of fluid flow and the rate of movement of the control member. The generation of the control signal is accomplished externally of the computer whenever an appreciable error is detected between the actual and desired rate of flow of fluid in the supply line.

Suitable logic circuitry is provided for effecting the comparison between the actual and desired rates of flow. The detected errors from previous time intervals are stored in temporary storage means. These previous errors are used as weighting factors to provide a control signal which insures smooth and accurate response of the control member to the coded electrical signals supplied by the computer.

It is the primary or ultimate object of the present invention to provide an improved control system for translating coded electrical signals representing a desired rate of movement of a control member to a smooth and accurate analog rate of movement of the control member.

Another object of the invention is to provide a digital-to-analog control system wherein the coded electrical signals from a digital computer are compared with feedback signals representing the actual rate of movement of the control member. Error signals are generated externally of the digital computer and form the basis for auxiliary control signals for varying the rate of movement of the control member.

A further object of the invention is to provide a control system of the type set forth in the above objects wherein the error signals detected during previous time intervals are used as weighting factors in the generation of the auxiliary control signals for regulating the rate of movement of the control member. The previous error signals are temporarily stored and then combined in a desired manner with the present error signals by suitable logic circuitry. The resultant auxiliary control signal exerts a smoothing action on the rate of movement of the control member and insures that the same faithfully follows the coded electrical signals from the digital computer.

A further object of the invention is the provision of a digital-to-analog control system in which fluid damping smoothes changes of state and wherein succeeding movements of the control member in either direction have substantial time continuity.

A still further object of the invention is to provide a digital-to-analog control system of the character above described which is simplified in construction and operation, uses conventional and commercially available components, is reliable and operates at high speeds.

The foregoing and other objects, features and advantages of the invention will be apparent from the following more particular description of preferred embodiments of the invention as illustrated in the accompanying drawings.

Figure 3:
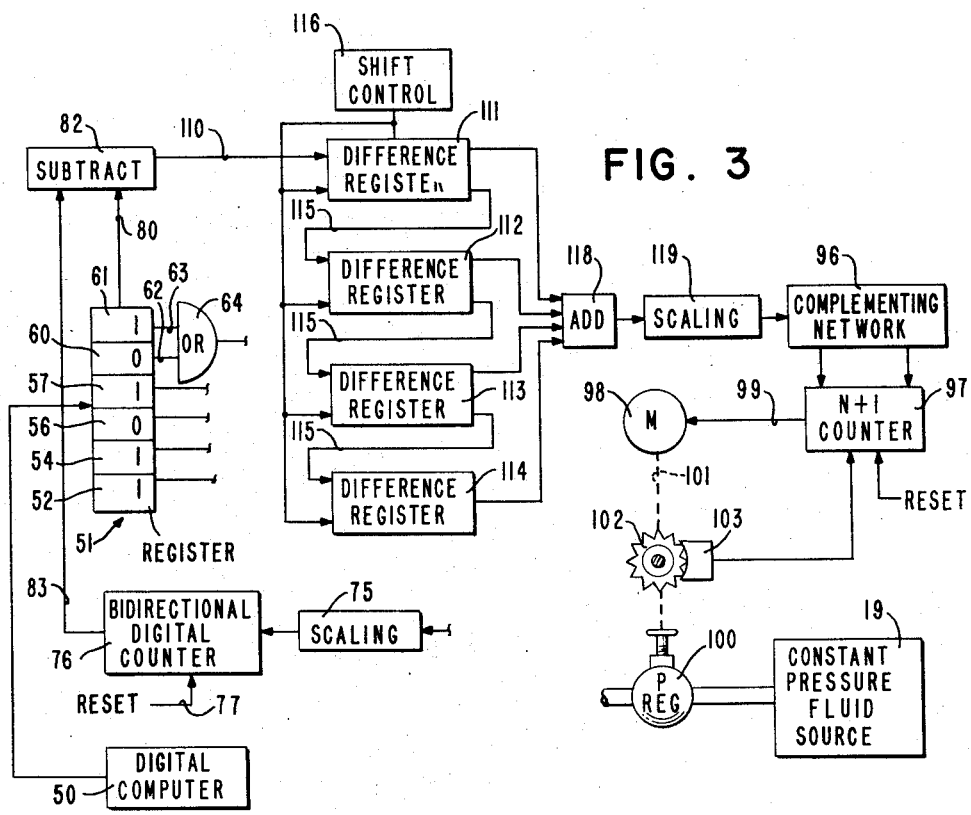
Figure 2:
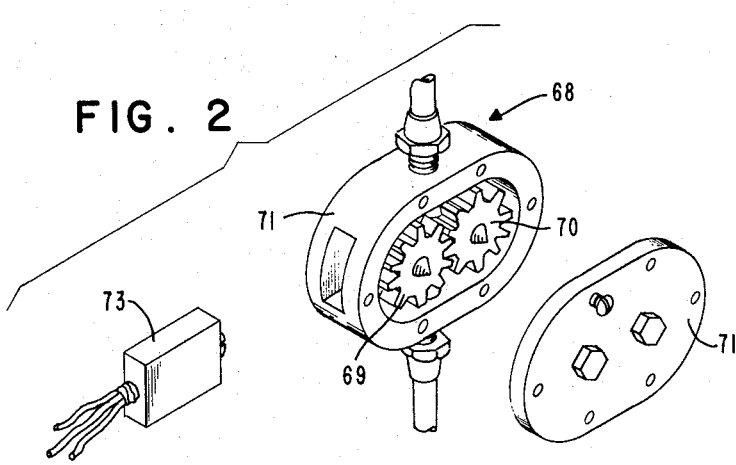

In the drawings:
FIGURE 1 is a schematic fluid and electrical circuit diagram of a digital-to-analog control system constructed and operated in accordance with the teachings of the present invention;
FIGURE 2 is an exploded perspective view of the pulse generating means used in connection with the control system of FIGURE 1; and
FIGURE 3 is a schematic electrical and fluid circuit diagram of another embodiment of the invention.

Referring now to the drawings and initially to FIGURE 1 thereof, there is shown a digital-to-analog control system for converting coded electrical signals to an analog rate of movement of a control member. The control system includes auxiliary control apparatus responsive to the present and previous difference signals indicating the error between the desired and actual rates of movement of a control member for insuring that the rate of movement of the control member accurately follows the coded electrical signals supplied by a digital computer.

The control system comprises a plurality of metering valves 10—13 which are connected in parallel with each other by conduits 15—18 and to a source 19 of fluid under pressure by a feed line 20. The fluid is preferably incompressible since such a fluid allows very accurate control of the movement of the control member as will be hereinafter more fully apparent. The metering valves 10—13 have calibrated orifices 21—24 therein for metering the flow of fluid from the source 19 to a main supply line 25. The sizes of the orifices 21—24 are related to each other and to the particular code system employed for the electrical signals supplied by the digital computer. Thus, if straight binary coding is employed, the size of the orifice 21 is equivalent to one unit; the size of orifice 22 is equivalent to two units; and the size of orifice 23 is equivalent to four units. The size of orifice 24 is slightly larger than the next number (eight) in the binary progression since the metering valve 13 is used for rough adjustment or slewing purposes. The system is designed so that only the metering valves 10—12 are required to effect the desired change in the rate of fluid flow during normal operation. The relative sizes of the orifices 21—24 are represented by the reference indicia 1, 2, 4 and 8+.

Control valves 26—29 are disposed in the branch conduits 15—18. Each of these valves has a valve spool 30 which is normally biased by a spring 31 to a position where the lands thereof block the ports of the valve. In this state of operation, the metering valve associated therewith (control valve 27 and metering valve 11 in FIGURE 1 of the drawings) is not in communication with the source 19 and fluid does not flow therethrough to the main supply line 25. Each of the control valves 26—29 has a solenoid 32 which, when energized, shifts the valve spool 30 to the left against the spring 31. This condition is represented by the control valves 26, 28 and 29 in FIGURE 1 of the drawings. Fluid will flow from the source 19 through the metering valves 10, 12 and 13 to the main supply line 25. The rate at which fluid is dispensed to the main supply line 25 is determined by which of the control valves 26—29 are opened, the relative sizes of the calibrated orifices 21—24 and the pressure of the fluid in conduits 15—18.

The main supply line 25 is connected with the center port 33 of a solenoid operated four-way valve 34 defining a sign actuating means. Ports 36 of the sign valve are connected by conduits to a low pressure sump, not particularly shown. Ports 37 and 38 are connected by supply lines 39 and 40 to the rod and head end of piston 41 of actuating cylinder 42. The sign valve 34 has a valve spool 43 which is normally biased in one position by spring 44. The valve spool 43 is shifted to its other position upon energization of a solenoid 45 and fluid flows from the main supply line 25 through the sign valve 34 and supply line 40 to the head end of actuating cylinder 42. Fluid is exhausted from the rod end of the actuating cylinder via supply line 39 and one of the ports 36. The arrangement is such that the piston 41 and a control member 47 carried thereby move to the left which, for the purposes of this application, is assumed to be the positive or plus (+) direction. However, when the solenoid 45 is de-energized, fluid from the main supply line 25 is directed to the rod end of actuating cylinder 42 and fluid is exhausted from the head end thereof. The control member 47 moves to the right in a negative or minus (−) direction. The valve 34 provides a convenient and highly simplified sign actuating means for controlling the direction of movement of the control member 47.

A digital computer is designated by the reference numeral 50 and is operative to periodically compute and provide coded electrical signals indicating the desired rate of fluid flow to the actuating cylinder 42. This determines the rates of movement of the control member 47. The computer also supplies various timing signals for use throughout the control system during each time interval. The time intervals between the times at which the coded electrical signals are supplied to the control system are relatively short when compared to the expected change of the rate of fluid flow and the rate of movement of the control member 47. Any digital computer capable of performing the above functions may be employed in connection with the control system of the present invention.

At the beginning of each time interval, a coded electrical signal is transferred from the computer to a binary register 51. The register 51 may comprise a plurality of multistable binary circuit devices, such as triggers, connected in cascaded relation with one device being provided for each stage or bit position. An example of this arrangement is shown in FIGURE 11 of co-pending U.S. patent application, Serial No. 99,755, filed March 31, 1961, to Paul H. Giroux, which is assigned to the same assignee as the present invention. The register 51 is shown to have a capacity of six bits (one sign bit and five value bits). However, it should be clearly understood that the size of the coded electrical signal supplied by the digital computer, the register 51 and the logic circuitry will depend upon the requirements of any particular application.

The first stage 52 of register 51 receives the sign information and is connected by conductor 53 to solenoid 45 of the sign valve 34. When a binary one is present in stage 52, the solenoid 45 is energized so that fluid flows to the head end of cylinder 42 and causes the control member 47 to move to the left. A binary one in the sign stage 52 indicates a positive movement while a binary zero represents a negative movement.

The second stage 54 of register 51 corresponds to the lowest order of rate information in the coded electrical signal and is connected by conductor 55 with the solenoid 32 associated with control valve 26 and metering valve 10. In a similar manner, the stages 56 and 57 are connected by conductors 58 and 59, respectively, to the solenoids 32 operating control valves 27 and 28. The remaining two and highest order stages 60 and 61 of the register 51 are connected by conductors 62 and 63 to an Or logic block 64. The Or logic block performs Boolean addition in that an output signal is present on conductor 65 when a one is stored in either stage 60 or stage 61 of the register.

The arrangement is such that the control valves 26—29 and the sign valve 34 are actuated in response to the coded digital electrical signal stored in the register 51. For example, if the coded electrical signal 110101 is stored in the register, the solenoid 45 is actuated and the control member 47 moves in a positive direction. Also, the solenoids 32 associated with control valves 26, 28 and 29 are energized whereby fluid flows from the source 19 through the calibrated orifices 21, 23 and 24 of the metering valves 10, 11 and 13 to the actuating cylinder 42.

Disposed in the supply line 40 between the sign valve 34 and the actuating cylinder 42 is a pulse generator 68. As shown in FIGURE 2 of the drawings, the pulse generator 68 comprises a pair of mating wheel gears 69 and 70 which are journaled for rotation in a housing 71. A variable reluctance magnetic transducer head 73 is nestingly received within the housing 71 in a transducing relation with respect to the teeth of the wheel gear 69. The fluid flowing in the supply line 40 causes the gears 69 and 70 to rotate. Each time a tooth of the wheel gear 69 passes the transducer head 73, a pulse is produced on conductor 74.

The pulses on conductor 74 are transmitted via scaling circuitry 75 to a bidirectional digital counter 76. The digital counter 76 may be of the type disclosed in co-pending U.S. patent application, Serial No. 862,341, filed December 28, 1959, entitled "Bidirectional Decade Counter" to Robert A. Leightner, which is assigned to the assignee of the present invention. The mode or add-subtract switches of the digital counter 76 are actuated in response to the direction of fluid flow in the supply line 40 by conventional control means, not particularly shown.

Each pulse on the conductor 74 indicates the passage of an incremental volume of fluid past the wheel gears 69 and 70. Proper scaling of the number of pulses occurring in a particular time interval will provide a coded electrical signal in the digital counter 76 representative of the average rate of flow through the supply line 40 during that time interval. The scaling circuitry 75 relates the pulses supplied by pulse generator 68 during a time interval to the length of that time interval. The scaling circuitry 75 may comprise simple pulse translating apparatus—i.e., a number of pulses are required before a single pulse is transmitted to the digital counter. Such an arrangement is more fully described on pages 29–05 to 29–08 of the book "Handbook of Automation Computation and Control," volume 2, published in 1959 by John Wiley and Sons, New York, New York. The bidirectional digital counter 76 contains a coded electrical signal at the end of each time interval which is an accurate representation of the actual and average rate of fluid flow to the actuating cylinder 42 during the time interval. The counter 76 is reset to zero at the beginning of each time interval by a reset signal supplied over conductor 77 by the digital computer 50.

Each pulse appearing on conductor 74 represents the passage of an incremental volume of fluid to the actuating cylinder 42. The output of pulse generator 68 is supplied to a bidirectional and direct reading meter 78 which totalizes the pulses. At any particular time in a control operation the meter 78 indicates the total net volume of fluid which has passed to the actuating cylinder 42 during that control operation. The pulses supplied by transducer head 73 are also transmitted to a bidirectional rate meter 79 of the integrating type which provides an instantaneous indication of the rate of fluid flow in the supply line 40.

At the beginning of each time interval a coded electrical signal is supplied to the register 51 by the digital computer 50. The coded electrical signal previously stored in the register is transferred over conductor 80 to subtract circuitry 82. At the same time the coded electrical signal recorded in the bidirectional digital counter 76 and representing the average and actual rate of fluid flow to the actuating cylinder 42 during the previous time interval is transmitted to the substract circuitry via conductor 83. The subtract circuitry may comprise a serial binary subtractor of a type well known in the art. Examples of such binary subtractors are found in chapter 12.4 of the book entitled "Computer Logic" by Ivan Flores, which was published in 1960 by Prentice-Hall, Inc., Englewood Cliffs, New Jersey.

The subtract circuitry 82 receives the coded electrical signals from the register 51 and the bidirectional digital computer 76 and subtracts the same to provide a coded difference signal on conductor 85. The coded difference signal on conductor 85 represents the error between the desired rate of fluid flow as indicated by the output supplied to the register 51 by the computer 50 and the actual rate of fluid flow as monitored by the pulse generator 68 and digital counter 76.

The difference signal serves as one input to add circuitry 86 which may comprise a binary adder of the type described in the above-mentioned book to Flores. The other input to add circuitry 86 is supplied by the digital computer 50 over the conductor 87 and is the coded electrical signal representing the predicted rate of flow for the new time interval. The add circuitry 86 addes the difference signal as determined from the desired and actual rates of flows for the previous time interval to the coded signal representing the desired rate of flow for the new time interval. A resultant and coded electrical signal corresponding to the total rate of fluid flow required during the new time interval is supplied via conductor 87 to multiply circuitry 88.

The difference signal on conductor 85 also serves as an input to add circuitry 90 and an accumulator 91. The accumulator 91 performs a temporary storage function and may comprise a series of cascaded multistable binary circuit devices, such as triggers. The accumulator 91 is disposed in a closed loop with respect to add circuitry 90 and is operative to store the difference signal from the immediately preceding time interval.

The difference signal supplied by the subtract circuitry 82 and the difference signal associated with the immediately preceding time interval stored in accumulator 91 are combined or added in add circuitry 90. At the same time, the new difference signal from subtract circuitry 82 is entered and stored in accumulator 91.

The output of add circuitry 90 is supplied via conductor 92 to digital shift and add one circuitry 93. This circuitry performs a translation function in that each train of pulses has a binary one added thereto. A logic circuit which complements the first or lower order bit and the succeeding bits in the train of pulses until a binary one is detected may be used for this purpose. Alternately, a binary adder, as shown in the above-mentioned book to Flores, may be employed. In any event, the signal on conductor 92 has a binary one added thereto and appears on conductor 94.

The coded electrical signals on conductors 87 and 94 are multiplied together in the multiply circuitry 88 to provide a weighted control signal on conductor 95. The weighted control signal is passed through a complementing network 96 and the two's complement of the binary representation is transferred in parallel to an $N+1$ order binary counter 97. The two's complement of an $n$ order binary number is that number which when added thereto gives a sum $2^{n+1}$. The multiply circuitry 88 may be of the type disclosed in chaper 12.5 of the above-identified book to Flores while the complementing network which provides the two's complement is described in U.S. Patent No. 2,972,137 to William H. Dunn, which is assigned to the assignee of the present invention. The $N+1$ order binary counter 97 is composed of $N+1$ triggers cascaded in binary fashion and the inputs are applied in parallel thereto by direct input to each respective trigger.

When the two's complement of the resultant control signal supplied by multiply circuitry 88 is introduced into the $N+1$ counter, a motor 98 is energized over conductor 99. The motor 98 immediately begins to drive the operator of pressure regulating valve 100 in a proper direction as determined by the sign information contained in the resultant coded electrical signal by way of gearing 101. The gearing 101 comprises a gear 102. A variable reluctance magnetic transducer head 103 is disposed in transducing relation with respect to the teeth of gear 102 and produces pulses indicating the adjustments made in the setting of pressure regulating valve 100. The pulses from transducer head 103 count the $N+1$ order counter to capacity which is indicated by a signal from the $N+1$ order of the counter. This signal is transferred via conductor 99 to de-energize the motor 98. At this time the setting of the pressure regulating valve 100 has been changed in response to the control signal supplied by multiply circuitry 88. It should be apparent that the setting of pressure regulating valve 100 will determine the upstream pressure for the metering valves 10—13 and effect the rate of fluid flow to the actuating cylinder 42. A reset signal is supplied to the $N+1$ order counter at an appropriate time in each time interval by the digital computer 50.

To demonstrate the functioning of the auxiliary logic circuitry it will be assumed that the difference 00010 is stored in the accumulator 91, the data portion of the control signal in register 51 is 10101, the data portion of the signal in the counter 76 is 10001 and the data portion of the new control signal supplied by digital computer 50 is 00100. To facilitate the following description it will be assumed that all of the above signals are positive.

At the beginning of a time interval the new control signal is introduced into the register 51 and add circuitry 86. The previous control signal (10101) and the signal corresponding to the actual rate of fluid flow in the time interval (10001) are subtracted by circuitry 82 to provide the new difference signal (00100). The previous difference signal (00010) is added to the new difference signal (00100) and the result (00110) is evidenced on conductor 92.

At the same time add circuitry 86 is adding the new difference signal (00100) and the new control signal (00100) to supply one input signal (01000) to multiply circuitry 88. The other input signal (00111) to multiply circuitry is supplied by digital shift and add one circuit 93 over conductor 94. The resultant output (111000) is supplied to complementing network 96 and $N+1$ counter 97 to control the setting of pressure regulating valve 100.

In FIGURE 3 of the drawings there is shown another embodiment of a digital-to-analog control system constructed and operated in accordance with the teachings of the present invention. Only a portion of the overall control system has been shown, it being understood that the remaining portion is the same as shown in FIGURE 1. Many of the component parts are the same and, to avoid unnecessary repetition in the specification, like component parts are designated by identical reference numerals in both embodiments of the invention.

The subtract circuitry 82 is connected by conductor 110 to a first difference storage register 111. Four difference storage registers 111—114 are connected in cascaded relation (the output of any intermediate register serves as an input to the adjacent register) by conductors 115. The difference registers are controlled by shift circuitry 116 which is in turn responsive to energizing signals supplied by the digital computer 50. Each of the difference registers has sufficient bit capacity to temporarily store a difference signal supplied by the subtract circuitry 82. Thus, difference register 111 contains the most recent difference signal, the register 112 the second difference signal, the register 113 the third difference signal and register 114 the fourth and oldest difference signal. After the end of a subsequent time interval a new difference signal will be supplied by subtract circuitry to the first difference register 111. At the same time each of the difference signals in the registers 111—113 will be transferred to the adjacent register (the difference signal in register 111 is transferred to register 112, etc.). This transfer of the difference signal upon the occurrence of a new difference signal is accomplished by the shift circuitry 116.

Each of the difference registers 111—114 is directly connected by a conductor 117 to add circuitry 118. The add circuitry 118 is operative once each time interval to combine the difference signals stored in the registers 111—114 and to provide an output signal which is the sum of the four difference signals. The output signal from the add circuitry 118 is transferred to scaling circuitry 119 which effectively divides the same by a scaling constant. The scaling constant may be equal to the number of difference signals combined—in this case four. The resultant coded control signal is then converted into two's complement form by complementing network 96 and introduced in parallel into the $N+1$ order binary counter 97. The setting of the pressure regulating valve 100 is changed in accordance with the resultant coded control signal.

In the disclosed embodiments of the invention the control signals from the multiply circuitry 88 and the scaling circuitry 119 have been used to control the settings of pressure regulating valves 100. However, it should be understood that these resultant control signals may be used in other ways to insure that the rate of movement of the control member accurately follows the coded electrical signals supplied by the digital computer. For example, the resultant control signals may be used to control the settings of scaling circuits 75 or the actuation of metering valves 10—14.

I should now be apparent that the objects initially set forth have been accomplished. Of particular importance is the provision of an analog-to-digital control system for the direct conversion of coded electrical signals to a change in the rate of movement or application of a force. The metering valves are actuated directly in response to the coded electrical signals from the computer. The actual flow of fluid is monitored and modulating weighted control signals based on the difference between the desired actual rates of flow insure that the movable member accurately follows the coded control signals.

While the invention has been particularly described with reference to preferred embodiments thereof, it will be understood by those skilled in the art that the foregoing and other changes in form and details may be made therein without departing from the spirit and scope of the invention.

What is claimed is:

1. Apparatus for converting a coded set of timed electrical signals wherein each of said electrical signals is characterized by either of two states, comprising:
   a source of fluid under pressure;
   a fluid drive means;
   means interconnecting said source and said fluid drive means;
   said means interconnecting comprising a plurality of parallel conduits;
   a precalibrated rate orifice disposed in each of said conduits;
   a control valve positioned in each of said conduits;
   a storage device for the temporary storage of said set of timed electrical signals;
   said storage device having a plurality of bit positions with each bit position storing one of said set of timed electrical signals;
   output means associated with said bit positions of said storage device and providing output signals corresponding to the timed electrical signals stored therein;
   each of said output signals actuating one of the control valves whereby when an output signal is in one state the control valve associated therewith is open to permit the flow of fluid and when said output signal is in the other state said control valve associated therewith is closed to prevent the flow of fluid;
   each of said precalibrated rate orifices having a size which corresponds to the decimal weighting of said set of electrical signals so that said drive means is supplied with fluid which is the analog equivalent of said set of timed electrical signals;
   a pulse generating means responsive to and producing pulses corresponding to the flow of fluid to said drive means;
   an accumulator means for storing the pulses generated by said pulse generating means during a timed control interval;
   comparator means for comparing said set of electrical signals and the quantity stored in said accumulator means at the end of a timed control interval to provide a difference signal;
   auxiliary valve means disposed between said source of fluid under pressure and said drive means; and
   control means for actuating said auxiliary valve means in response to said difference signal.

2. Apparatus according to claim 1 characterized by:
   said output means comprising logic means combining at least the two highest ordered ones of said set of timed electrical signals; and
   the precalibrated rate orifice associated with the output signal from said logic means being larger than the lowest ordered one of said set of timed electrical signals supplied to said logic means.

3. Apparatus for converting a binarily coded set of timed electrical signals to an analog quantity, comprising:
   a source of fluid under pressure;
   a fluid drive means;

means interconnecting said source and said fluid drive means;
said means interconnecting comprising a plurality of parallel conduits;
a precalibrated rate orifice disposed in each of said conduits;
a control valve positioned in each of said conduits;
output means interconnecting said set of timed electrical signals and the control valves and providing output signals corresponding to said set of timed electrical signals;
each of said output signals operating one of the control valves so that when said control valve is opened fluid flows from said source, through said rate orifice associated therewith and to said drive means;
each of said precalibrated rate orifices having a size which corresponds to the decimal weighting of the output signal operating the control valve associated therewith whereby said drive means is supplied with fluid which is the analog equivalent of said set of timed electrical signals;
a pressure regulating valve disposed between said source of fluid under pressure and said parallel conduits;
a pulse generating means disposed between said parallel conduits and said fluid drive means;
said pulse generating means producing pulses in accordance with the volume of fluid flowing to said fluid drive means; and
control means responsive to the pulses produced by said pulse generating means for actuating said pressure regulating valve.

4. Apparatus according to claim 3 characterized by said pulse generating means further comprising:
a housing;
a pair of mating wheel gears journaled in said housing and being rotated by the fluid flowing to said fluid drive means; and
a variable reluctance magnetic transducer disposed in transducing relation with respect to one of said pair of gear wheels for providing said pulses.

5. Apparatus according to claim 3 characterized by said control means responsive further comprising:
a binary counting device for recording the pulses supplied by said pulse generating means;
said binary counting device providing an indication of the amount of fluid flowing to said drive means in a timed control interval; and
comparator means for comparing said set of timed electrical signals and said indication in said counting device at the end of a timed control interval for actuating said pressure regulating valve.

6. Apparatus for converting a coded set of electrical signals to an output quantity, comprising:
a source of fluid under pressure;
a fluid receiving means;
means interconnecting said source and said fluid receiving means;
said means interconnecting comprising a plurality of precalibrated dispensing devices;
output means connecting said set of electrical signals and said precalibrated dispensing devices and providing output signals corresponding to said set of electrical signals;
each of said control signals operating one of the precalibrated dispensing devices so that said fluid receiving means is supplied with fluid which is the equivalent of said set of timed electrical signals;
means for generating a coded set of electrical signals corresponding to the flow of fluid to said fluid receiving means during a timed control interval;
auxiliary control means for regulating the flow of fluid to said fluid receiving means;
comparator means for comparing the first and second mentioned sets of electrical signals at the end of said timed control interval to provide a difference signal; and
control means for actuating said auxiliary control means in response to said difference signal.

7. Apparatus according to claim 6 characterized by said auxiliary control means further comprising:
a pressure regulating valve disposed in said means interconnecting between said source and said fluid receiving means.

8. Apparatus according to claim 6 characterized by said control means for actuating further comprising:
circuit means for combining said difference signal with at least the difference signal provided during the previous timed control interval to define a control signal; and
said control signal controlling the operation of said auxiliary control means.

9. Apparatus according to claim 6 characterized by said control means for actuating further comprising:
first circuit means for adding said difference signal and the coded set of electrical signals for the next timed control interval to provide a first coded signal;
second circuit means for adding said difference signal with the difference signal provided during the previous timed control interval to provide a second coded signal;
means to multiply said first and second coded signals to provide an output control signal; and
said output control signal controlling the operation of said auxiliary control means.

10. Apparatus for converting a coded set of electrical signals to an output quantity, comprising:
a source of energy;
an energy receiving means;
means interconnecting said source and said receiving means;
said means interconnecting comprising a plurality of valve means connected in parallel;
output means interconnecting said set of electrical signals and said valve means and providing output signals corresponding to said set of electrical signals;
each of said output signals operating one of the valve means so that said receiving means is supplied with energy which is the equivalent of said set of timed electrical signals;
means for generating a set of electrical signals corresponding to the flow of energy to said receiving means during a timed control interval;
auxiliary control means for regulating the flow of energy to said receiving means;
comparator means for comparing the first and second mentioned sets of electrical signals at the end of a timed control interval to provide an auxiliary control signal; and
control means for actuating said auxiliary control means in response to said auxiliary control signal.

11. Apparatus according to claim 10 characterized by:
each of said plurality of valve means is operative when actuated to permit the flow of energy corresponding to the decimal weighting of the one of said first mentioned set of electrical signals.

12. Apparatus according to claim 10 characterized by said control means for actuating further comprising:
means for storing the auxiliary control signal provided during a previous timed control interval;
circuit means for combining said first mentioned auxiliary control signals with the said auxiliary control signal provided during a previous timed control interval to define a resultant control signal; and
said resultant control signal controlling the operation of said auxiliary control means.

13. Apparatus according to claim 10 characterized by said control means for actuating comprising:
means for storing the auxiliary control signals provided during at least two previous timed control intervals;

circuit means for combining said first mentioned auxiliary control signal with said last mentioned auxiliary control signals at the end of a timed control period to define a resultant control signal; and said resultant control signal controlling the operation of said auxiliary control means.

14. Apparatus according to claim 13 characterized by said means for storing comprising:

a shift register for storing each of said auxiliary control signals;

said shift registers being connected in series cascaded relation; and said circuit means for combining comprising output conductors leading from said shift registers.

15. Apparatus for converting a binarily coded set of electrical signals to an analog quantity, comprising:

a source of fluid under pressure;

a fluid receiving means;

means interconnecting said source and said fluid receiving means;

said means interconnecting comprising a plurality of parallel conduits;

a precalibrated rate orifice in each of said conduits;

a control valve positioned in each of said conduits;

means for combining at least two of said set of electrical signals and providing a control signal for actuating one of said valves;

each of the remaining ones of said set of electrical signals operating one of said valves;

each of said precalibrated rate orifices associated with said remaining ones of said set of electrical signals having sizes corresponding to the decimal weighting of said remaining ones of said set of electrical signals; and the precalibrated rate orifice associated with said one of said valves having a size larger than the decimal weighting of the lowest ordered one of those of said set of electrical signals supplied to said means for combining.

16. Apparatus for converting a binarily coded set of electrical signals to an analog quantity, comprising:

an energy source;

an energy receiving means;

means interconnecting said energy source and said energy receiving means;

said means interconnecting comprising a plurality of parallel conduits;

each of said conduits providing for the flow of energy from said source to said receiving means at a precalibrated rate;

control means associated with each of said conduits for blocking and permitting the flow of energy therethrough;

means for combining a portion of said set of electrical signals and providing a control signal for actuating one of said control means;

each of the remaining ones of said set of electrical signals operating one of said control means;

each of said conduits associated with said remaining ones of said set of electrical signals being precalibrated to permit the flow of energy therethrough in a manner corresponding to the decimal weighting of said remaining ones of said set of electrical signals; and the conduit associated with said one of said control means permitting the flow of energy therethrough at a rate which is greater than the decimal weighting of the lowest ordered one of said set of electrical signals supplied to said means for combining.

17. Apparatus for converting a coded set of electrical signals to an output quantity, comprising:

a source of energy;

an energy receiving means;

means interconnecting said source and said receiving means;

said means interconnecting comprising a plurality of conduit means connected between said source and said receiving means;

control means associated with each of said conduit means for permitting or blocking the flow of energy therethrough;

output means interconnecting said set of electrical signals and said control means and providing output signals corresponding to said set of electrical signals;

means for generating a set of electrical signals corresponding to the flow of energy to said receiving means during a timed control interval;

auxiliary control means for regulating the flow of energy to said receiving means;

comparator means for comparing the first and second mentioned sets of electrical signals at the end of a timed control interval to provide an auxiliary control signal; and control means for actuating said auxiliary control means in response to said auxiliary control signal.

No reference cited.